(No Model.)

R. H. ELLIOTT.
HEDGE TRIMMER.

No. 454,337. Patented June 16, 1891.

Witnesses
Edwin L. Bradford
E. Everett Ellis

Inventor
Robert H. Elliott
By his Attorney
Wm. C. McIntire

UNITED STATES PATENT OFFICE.

ROBERT H. ELLIOTT, OF BIRMINGHAM, ALABAMA.

HEDGE-TRIMMER.

SPECIFICATION forming part of Letters Patent No. 454,337, dated June 16, 1891.

Application filed January 12, 1891. Serial No. 377,431. (No model.)

*To all whom it may concern:*

Be it known that I, ROBERT H. ELLIOTT, a citizen of the United States, residing at Birmingham, in the county of Jefferson and State of Alabama, have invented certain new and useful Improvements in Hand Harvesting-Machines; and I do hereby declare the following to be a full, clear, and exact description of the invention, such as will enable others skilled in the art to which it appertains to make and use the same.

This invention relates to certain new and useful improvements in hand harvesting-machines or hedge-trimmers; and it consists, substantially, in such features of arrangement, construction, and combination of parts as will hereinafter be more particularly described, and pointed out in the claims.

The object of the invention is to provide a hand harvesting-machine or hedge-trimmer in which horse or other power—such as steam—is utilized with superior effect and result, all as will hereinafter more fully appear when taken in connection with the accompanying drawings, wherein—

Figure 1:
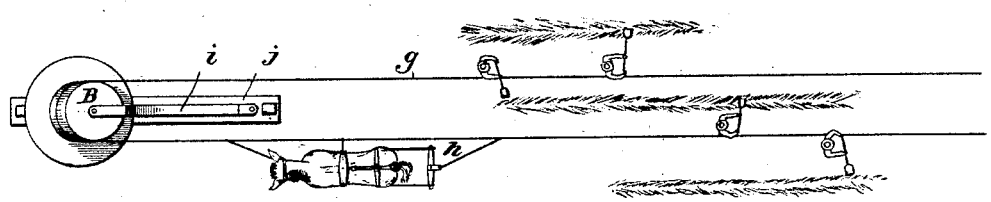
Figures 2, 3, 5:
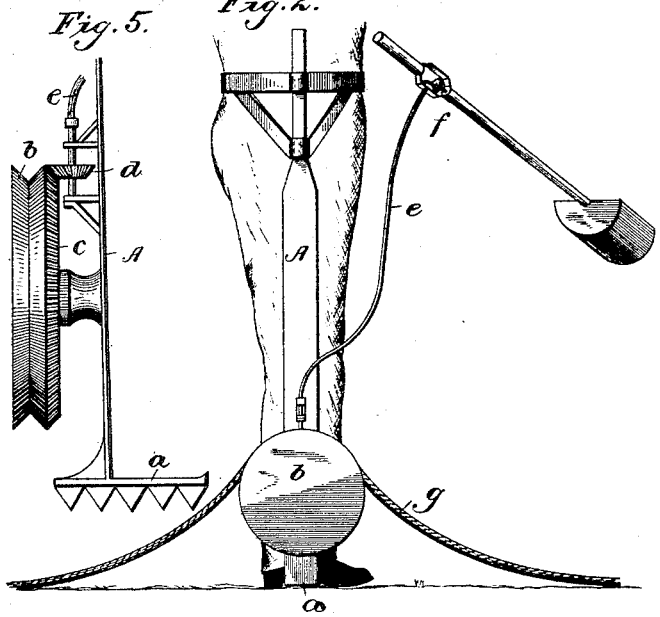
Figure 4:
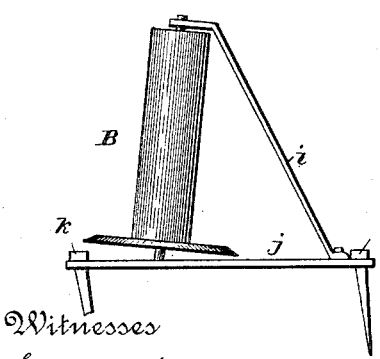
Figure 6:
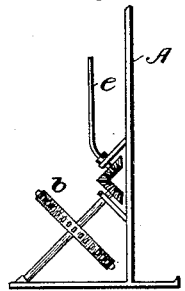
Figure 7:
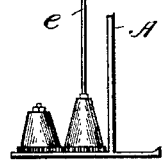

Figure 1 represents a ground plan of my invention in operation. Fig. 2 is a side view of my invention suspended from the body or waist of the operator. Fig. 3 is a front view of Fig. 2. Fig. 4 is a detail view of one of the spools or drums employed for guiding the rope, chain, or cable around the ends of the rows of hedges. Fig. 5 is an enlarged view of a portion of my device, and Figs. 6 and 7 are views representing modifications in the arrangement of the drive-wheel.

In carrying my invention into effect I provide a frame which is adapted to be secured around the waist of the operator handling the machine, and said frame is adapted by its construction to be suspended alongside the limb of the operator in such manner as to be carried along with him (the operator) as he walks along in effecting the cutting or trimming of hedges or in harvesting operations. The said frame carries a suitably-mounted drive wheel or pulley, which is operated by means of a rope, cable, or chain, the moving power of which is a horse or other animal hitched thereto. The said rope, cable, or chain is passed around suitably-arranged and specially-constructed spools or drums located at each end of the rows of hedges being cut and the drive wheel or pulley is connected by intermediate mechanism with the harvester or cutter proper in such manner as that the rotary motion imparted to such wheel will be transmitted to said harvester or cutter while held in the hands of the operator.

Reference being had to the accompanying drawings by the letters marked thereon, A represents a strip or frame, which, as shown, is provided at or near its upper end with securing-straps for adapting the same to be attached to or suspended from the waist of the operator. This frame is provided at its bottom or lower end with a foot-rest $a$, which facilitates the carrying or moving of the device by the operator as he walks along, and working on a journal projecting from the side of said frame is a drive wheel or pulley $b$, which is provided on its edge adjacent to the frame with teeth or cogs $c$, meshing with a small cog-wheel $d$, carried by the lower end of a flexible shaft $e$, which extends up to the harvester or trimmer $f$ in the manner shown in the drawings. The harvester or trimmer $f$ may be of any preferred form of construction designed to be operated through the medium of a revolving flexible shaft, and hence no special description thereof is herein furnished. The said shaft is held in and supported by suitable bearings projecting from the side of the frame, as shown, so that on the turning of the drive wheel or pulley the same will be caused to revolve. The motive power of the drive-wheel is a rope, chain, or cable $g$, passing over the same and drawn by a horse or other animal, as seen at $h$.

It is evident that the harvesting operation or the trimming of hedges may be effected by the operator as he walks along.

In order to sustain and guide the rope, chain, or cable I employ at the ends of the rows of hedges a drum B, having its bearings in a frame $i$ and a platform $j$, as shown, the said device being intended to be supported in position by means of pegs $k$ $k$, which are inserted through the platform and enter the ground.

Instead of the preferred form of drive-wheel, as illustrated by Figs. 2, 3, and 5, I sometimes employ the forms which I have represented in Figs. 6 and 7, the first of which represents the drive-wheel as being in the form of a sprocket-wheel, in which instance it will be understood that a sprocket-chain is to be employed to rotate the same. In the second instance I employ two cones, each having a vertical axis and the two being connected by cog-gearing, as shown. The rope, chain, or cable passing between these cones will operate them by friction in an obvious manner.

Having thus described my invention, what I claim as new, and desire to secure by Letters Patent, is—

1. A portable hedge-trimmer or hand harvesting-machine fastened to the body of the operator and operated by an endless traveling cable passing around a supporting-drum at either end of the field and kept in motion by any suitable power, substantially as described.

2. In a portable hedge-trimmer or hand harvesting-machine, the combination of the frame A, adapted to be fastened to the body of the operator and formed with a foot-rest at its bottom, the cog-pulley $b$, carried by said frame, the flexible shaft $e$, carrying a trimmer and having at its lower end a cog-wheel meshing with said pulley, and an endless traveling cable for operating said machine, the same being kept in motion by a horse or other suitable power, substantially as described.

In testimony whereof I affix my signature in presence of two witnesses.

ROBERT H. ELLIOTT.

Witnesses:
J. B. ROBINSON,
E. F. HOFFORD.